US011892196B2

(12) United States Patent
Katikala et al.

(10) Patent No.: US 11,892,196 B2
(45) Date of Patent: Feb. 6, 2024

(54) CONDENSATE TRAP

(71) Applicant: Carrier Corporation, Palm Beach Gardens, FL (US)

(72) Inventors: Lok Sudhir Katikala, Telangana (IN); Sai Krishna Kunchala, Telangana (IN); Vishnu Shayan Nvss, Telangana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 439 days.

(21) Appl. No.: 17/123,482

(22) Filed: Dec. 16, 2020

(65) Prior Publication Data
US 2021/0318029 A1 Oct. 14, 2021

(30) Foreign Application Priority Data

Apr. 13, 2020 (IN) .............................. 202011015961

(51) Int. Cl.
*F24H 8/00* (2022.01)
*F16K 1/14* (2006.01)
*F16K 31/20* (2006.01)

(52) U.S. Cl.
CPC .............. *F24H 8/006* (2013.01); *F16K 1/14* (2013.01); *F16K 31/20* (2013.01)

(58) Field of Classification Search
CPC .. F24H 8/006; F16K 1/14; F16K 31/20; F23J 2900/13004; F16T 1/22; Y02B 30/00
See application file for complete search history.

(56) References Cited

U.S. PATENT DOCUMENTS

| | | | | |
|---|---|---|---|---|
| 1,882,196 A | * | 10/1932 | Siems | G01F 11/284 |
| | | | | 222/25 |
| 2,920,644 A | * | 1/1960 | Schulze | F16K 31/18 |
| | | | | 137/433 |
| 4,682,579 A | | 7/1987 | Bigham | |
| 4,729,328 A | | 3/1988 | Shellenberger | |
| 4,856,550 A | | 8/1989 | Smelcer | |
| 6,129,110 A | * | 10/2000 | Kolb | F16K 31/18 |
| | | | | 137/433 |
| 6,848,465 B1 | * | 2/2005 | Ledbetter | F16K 24/044 |
| | | | | 137/433 |
| 7,112,308 B2 | | 9/2006 | Smith | |
| 8,931,438 B2 | | 1/2015 | Walters et al. | |
| 9,080,689 B2 | | 7/2015 | Ariizumi | |

(Continued)

*Primary Examiner* — Patrick C Williams
(74) *Attorney, Agent, or Firm* — CANTOR COLBURN LLP

(57) ABSTRACT

Aspects of the invention are directed to condensate traps having a back portion and a front portion. The back portion includes a first passage enclosed between the first wall, a second wall, and a back wall. A first opening in the back portion connects the first wall and the second wall with a first float placed over the first opening and does not travel below the first opening and is prevented from leaving the first passage by a first constriction. The front portion of the condensate trap includes a second passage enclosed between the third wall and the fourth wall. A second opening connects the third wall and the fourth wall in the front portion and a second float is placed below the second opening such that it does not travel through the second opening and is prevented from falling below a predetermined level by a second constriction.

13 Claims, 13 Drawing Sheets

(56) References Cited

U.S. PATENT DOCUMENTS

| | | |
|---|---|---|
| 9,777,957 B1 | 10/2017 | Des Champs |
| 9,909,778 B2 | 3/2018 | Rakowski et al. |
| 10,401,027 B2 | 9/2019 | Leung et al. |
| 10,544,872 B2 | 1/2020 | Bright |
| 2001/0054438 A1* | 12/2001 | Shimamura ........... F16K 24/044 137/202 |
| 2003/0098063 A1* | 5/2003 | Mori ................ B60K 15/03519 137/202 |
| 2004/0211465 A1* | 10/2004 | Miyoshi ................ F16K 24/044 137/202 |
| 2006/0213555 A1* | 9/2006 | Miura .................. F16K 24/044 137/202 |
| 2015/0252760 A1* | 9/2015 | Mihara .................. F02M 37/20 137/202 |
| 2016/0031315 A1* | 2/2016 | Suzuki ................... B60K 15/04 137/202 |
| 2019/0234651 A1 | 8/2019 | Kilgo et al. |
| 2020/0001703 A1 | 1/2020 | Vulkan et al. |

\* cited by examiner

300

114A

114B

114C

114D

114E

114F

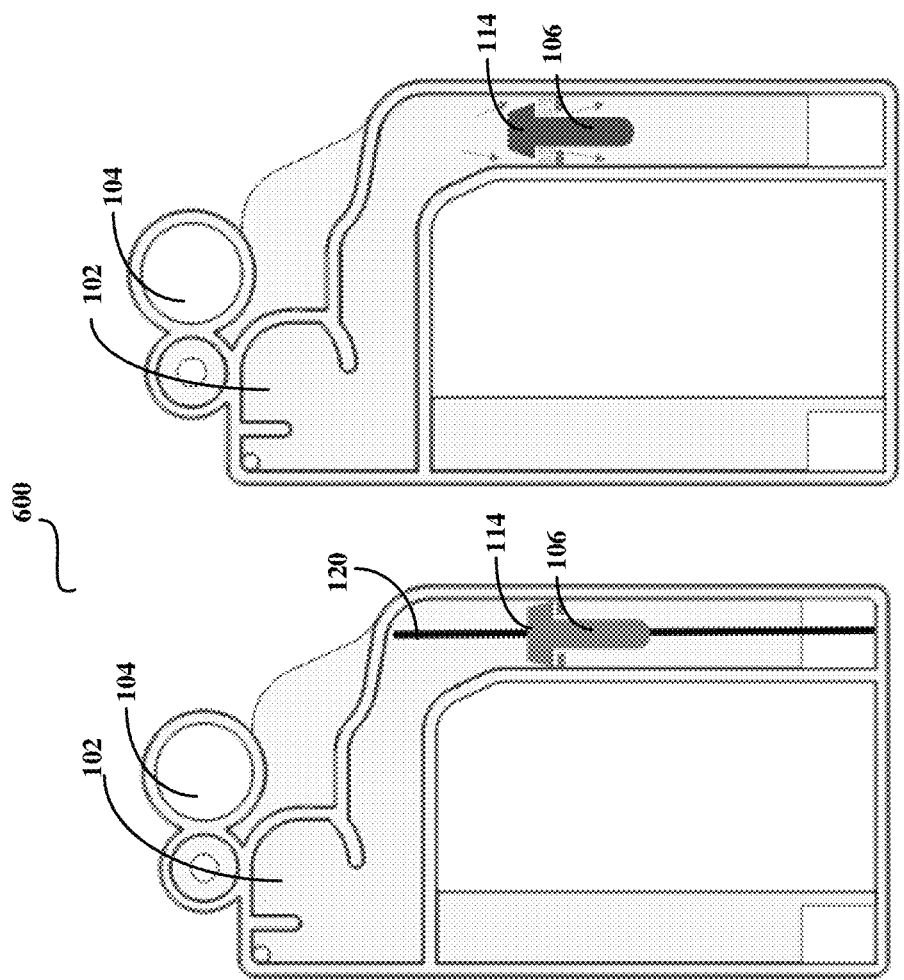

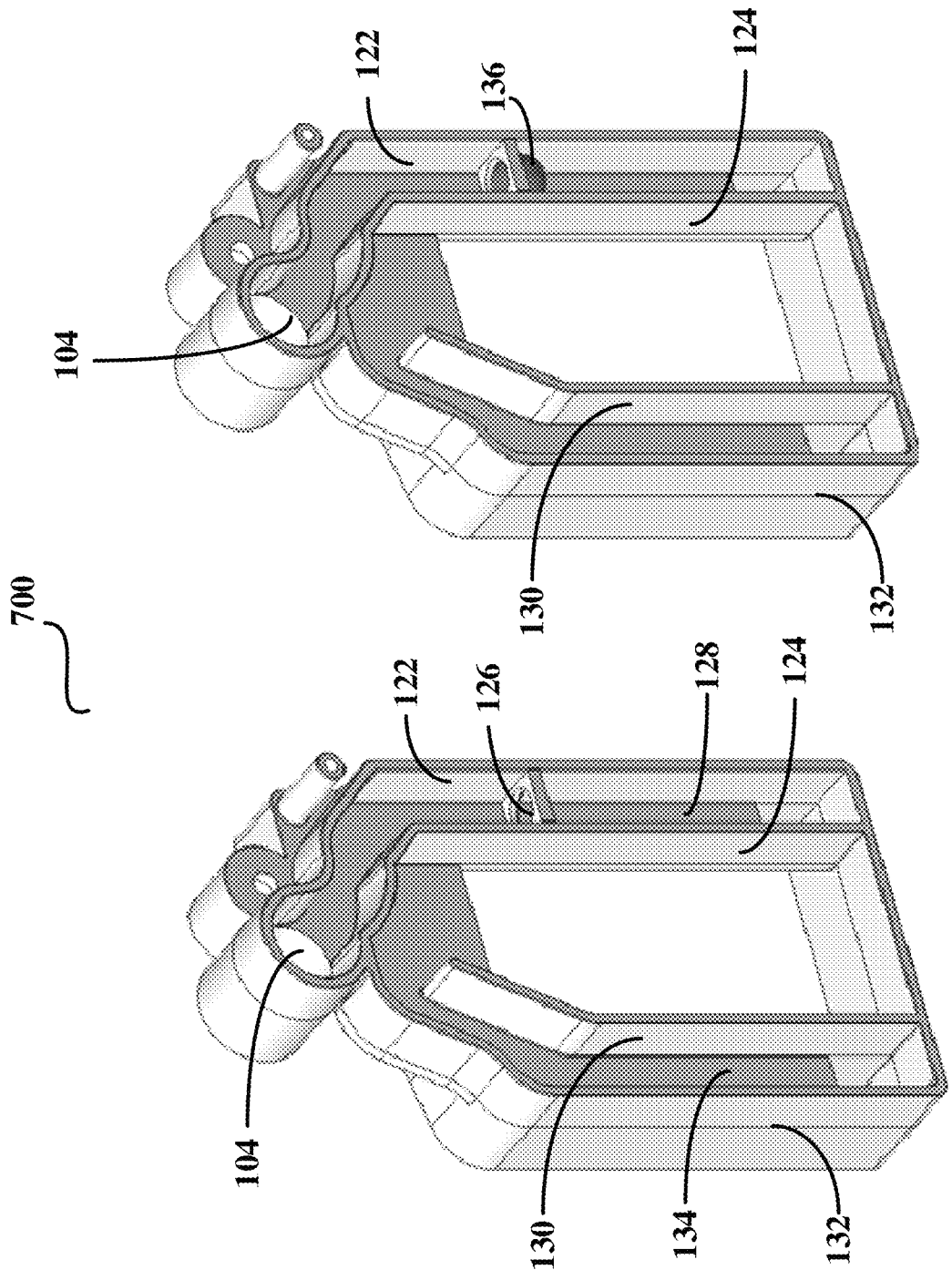

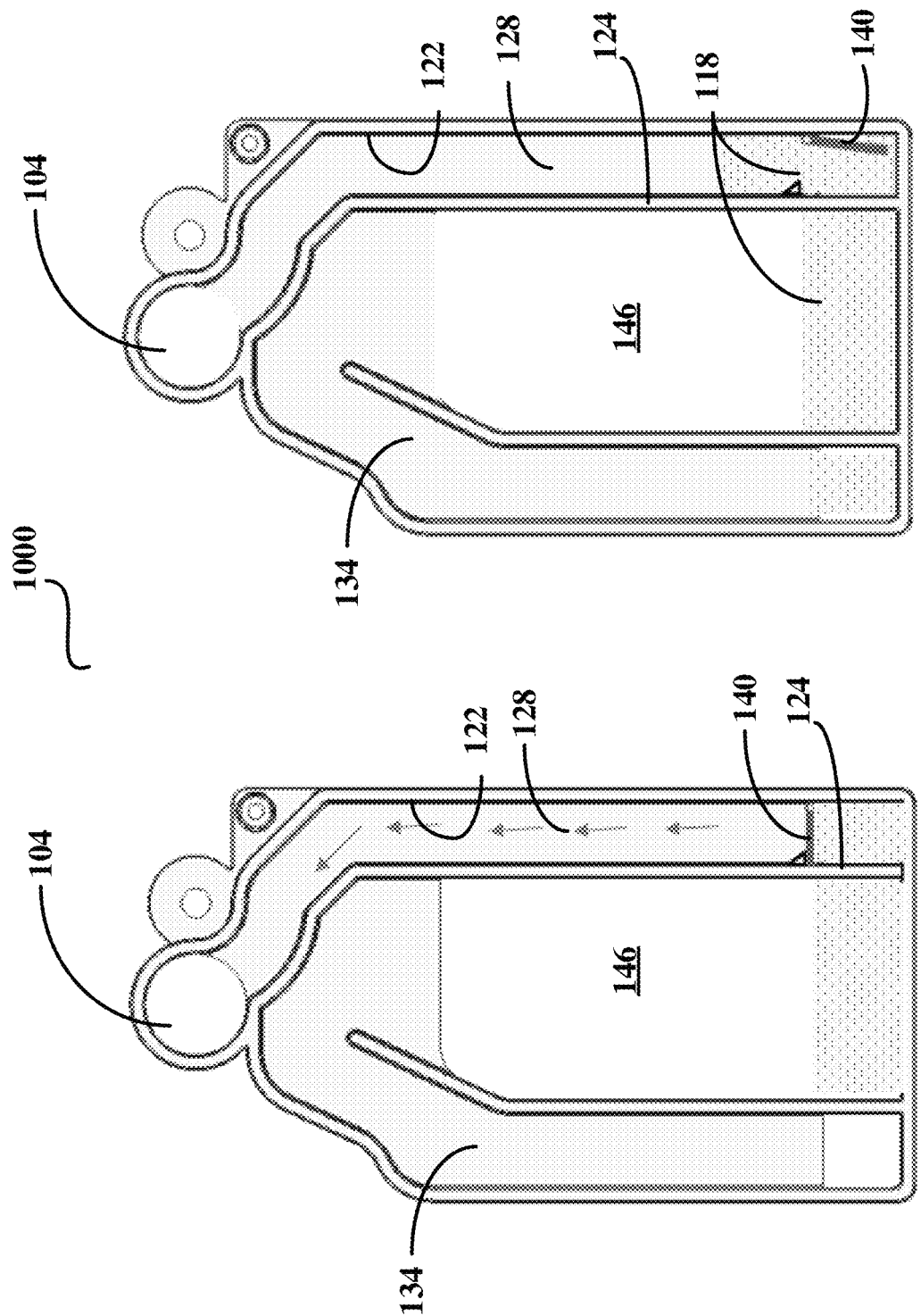

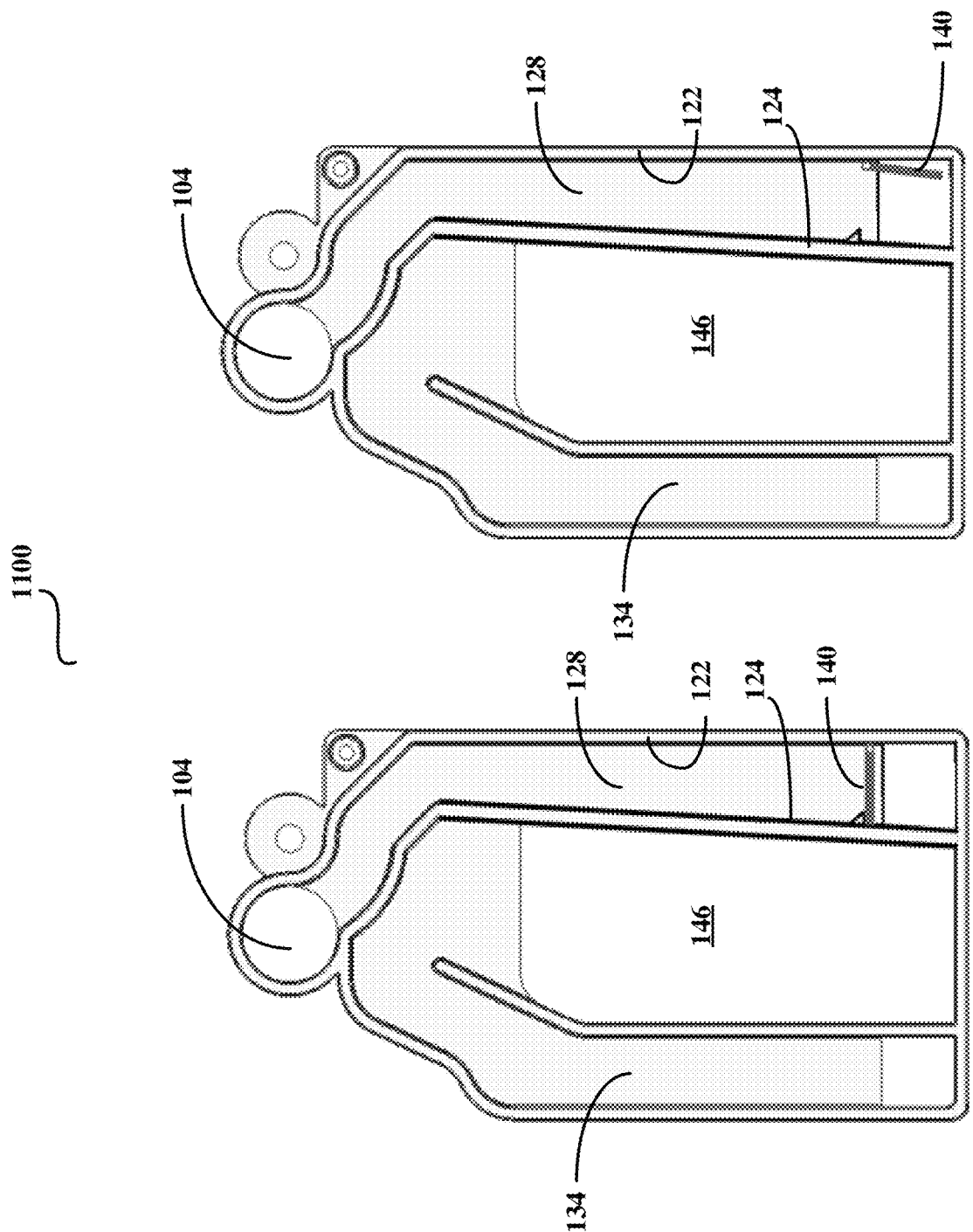

CONDENSATE TRAP

CROSS-REFERENCE TO RELATED APPLICATIONS

This application claims priority to Indian Patent Application No. 202011015961, filed Apr. 13, 2020, the contents of which are incorporated by reference herein in their entirety.

BACKGROUND

The present invention generally relates to heating, ventilation, and air conditioning (referred hereinafter as "HVAC") system. More particularly, the invention relates to means for controlling the discharge of the condensate and flue gas by-products of combustion in a multi-poise gas furnace.

Gas furnaces typically include a heat exchanger having a combustion chamber for combustion of a fuel and air mixture. The heat exchanger is designed to permit the passage of air over it. Often the heat exchanger includes a secondary heat exchanger to enhance the transfer of heat to a medium which is then directed to an enclosure for heating.

Simultaneously with transfer of heat from the combustion products, the combustion products are cooled and liquid condensate is formed during the heat extraction process particularly in the secondary heat exchanger. The condensate is typically collected and directed through a condensate trap from the heat exchanger to a drain.

The flue gas products or combustion by-products discharge to outside atmosphere. The condensate flows through different passages in the collector box and is collected in a condensate trap. However, condensate trap used in the existing condensing gas furnaces cannot handle high positive pressures caused due to clogged vents and high rpm of inducer motors. In some furnaces, when the exhaust vent is clogged, the system experiences high pressures (approx. 6.5" Water column) which tries to escape to the area being ventilated and spilling away the condensate and thus creating a void that allows the flue gases into the room which is very dangerous to occupants. Also, the existing trap is open to ambient atmosphere while furnace is not operating, allowing the contaminants to pass through the condensate trap and settle in the flue path which reduces the overall system efficiency.

Thus, the existing condensate traps do not have any features that stops the leakage of flue gases to room until sufficient condensate collects in the reservoir. Also, the existing condensate trap does not hold good for high pressures. Such high-pressure flue gases spill out the already collected condensate out from trap.

In view of the afore-mentioned problems, there is a need of an efficient and effective condensate trap which can control the discharge of the condensate and the flue gases appropriately.

SUMMARY

Various embodiments of the invention describe a condensate trap used in gas furnace systems. The condensate trap comprises a back portion and a front portion. The back portion comprises a first passage enclosed between the first wall, a second wall, and a back wall defining the passage. The back portion further comprises a first opening which connects the first wall and the second wall. A first float is placed over the first opening such that the float does not travel below the first opening. There is a first constriction above the first opening such that the first float is not allowed to leave the first passage. The front portion of the condensate trap comprises a second passage enclosed between the third wall and the fourth wall. The front portion comprises a second opening connecting the third wall and the fourth wall. A second float is placed below the second opening such that the second float does not travel through the second opening. The front portion also comprises a second constriction below the second opening such that the second float does not fall below a predetermined level.

In an embodiment of the invention, the front portion further comprises a third passage enclosed between a fifth wall and a sixth wall. Further, the third passage comprises a levered flap to enclose the third passage.

In a different embodiment of the invention, the first float is of spherical shape, a cylindrical shape with a cap, or I-shaped with ends floating between the first opening.

In an embodiment of the invention, a back wall of the first passage comprises a slide feature to hold the first float in the first opening.

In another embodiment of the invention, the first float comprises a guide through the first float enabling the first float to move in vertical direction.

In yet another embodiment of the invention, the front portion is configured with a variable cross-sectional area of the passage between the third wall and the fourth wall.

In another embodiment of the invention, the variable cross-sectional area comprises a levered float near the bottom portion of the second passage.

In still another embodiment of the invention, the variable cross-sectional area of the front portion creates more negative pressure at the bottom of the second passage.

In a different embodiment of the invention, the back portion comprises a first enclosure adjacent to the first passage.

In another embodiment of the invention, the condensate trap manages the flow of condensate and flue gases in a gas furnace.

In an embodiment of the invention, when there is a positive pressure in the condensate trap, and there is no condensate collected in the first passage, the first float is pushed by the positive pressure in the first opening.

In an embodiment of the invention, the condensate is collected on the first float during the positive pressure, the first float is pushed in upward direction and the condensate flows through the first opening.

In a different embodiment of the invention, when the condensate collected over the first float flows through the opening completely, the first float returns in the first opening under the influence of flue gases.

In yet another embodiment of the invention when there is a negative pressure in the condensate trap, and condensate is collected in the second passage below the second opening, the second float is pushed up by the negative pressure and placed in the second opening.

In yet another embodiment of the invention, when the second float is placed in the second opening, the condensate collected below the second opening is prevented to pass through the second opening.

In another embodiment of the invention, when the condensate is collected above the second opening, the second float moves down to allow the condensate to pass through the second opening and collect below the second opening.

In yet another embodiment of the invention, the levered flap is in closed position when the furnace is not in operating condition In another embodiment of the invention when furnace is operating, the condensate collected below the levered flap moves in upward direction by opening the levered flap and flows in a central chamber of the front portion.

In an embodiment of the invention, the back portion is provided with a cover, wherein a portion of the first opening is attached with the cover and other portion of the first opening is attached with the back portion within the first wall and the second wall.

In another different embodiment of the invention, the condensate trap comprises a condensate and flue gases inlet and a condensate drain outlet.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Other aspects, advantages, and salient features of the invention will become apparent to those skilled in the art from the following detailed description, which taken in conjunction with the annexed drawings, discloses exemplary embodiments of the invention.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

FIGS. 6A-6B depict the placement of the float in the condensate trap according to an embodiment of the invention.

FIG. 7A depicts a front portion of the condensate trap according to an embodiment of the invention. FIG. 7B depicts placement of the float in the front portion of the condensate trap.

FIGS. 10A-10B depict working of the condensate trap in accordance with an embodiment of the invention.

FIGS. 11A-11B depict different features and modifications in the condensate trap according to an embodiment of the invention.

Corresponding reference numerals indicate corresponding parts throughout the drawings.

DETAILED DESCRIPTION

Figure 1:
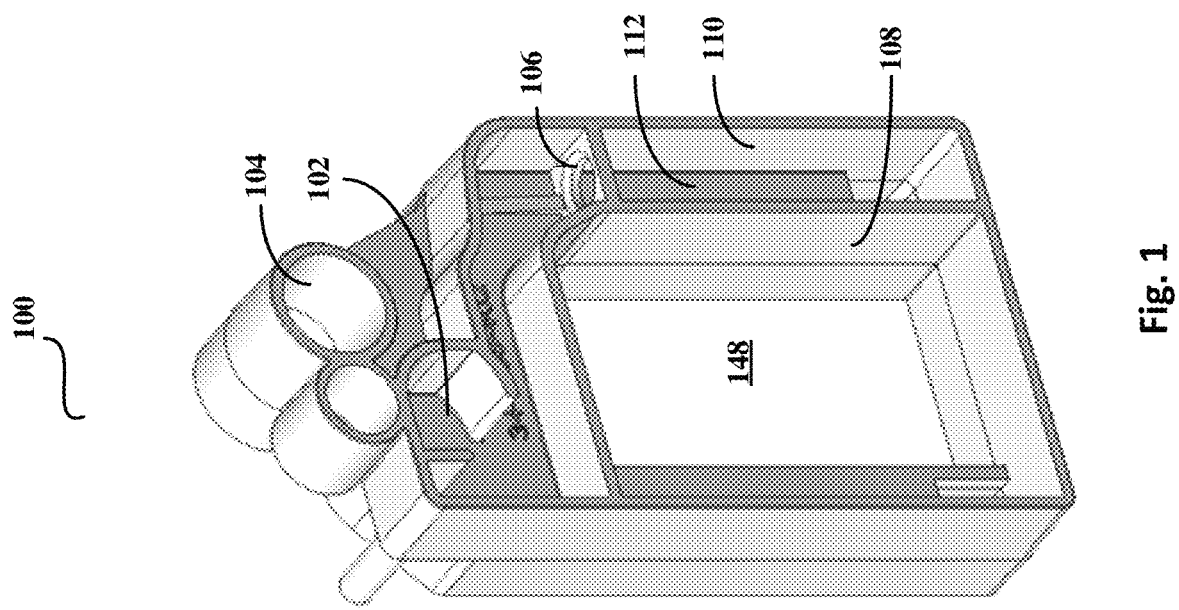
FIG. 1 depicts an exemplary architecture of a back portion of a condensate trap according to an embodiment of the invention.

Described herein is an improved condensate trap used in multi-poise gas furnaces which allows upflow, down flow, left flow and right flow installations of gas furnaces. The condensate trap described in the present invention is capable of stopping the flue gases and the condensate to flow inappropriately in the event of clogged vents and high inducer motor speed in gas furnace. The condensate trap is designed to control both the positive pressure and the negative pressure flow of flue gases and condensate inside the condensate trap.

As described herein, a positive pressure is the flow of the flue gases as it passes through the vent to a collector box and to the back side of the trap towards a drain. The positive pressure is created due to blockage in the vent which acts as an obstruction to the flow of flue gases. Due to the blockage, the pressure gets build up and the only path which flue gases can take is through the condensate trap from first inlet and tries to escape into the room by pushing the condensate. The positive pressure may include flue gases produced after combustion of the air-fuel mixture. The flue gases are harmful; therefore, they are required to be ejected from the gas furnace safely.

Normally, when the gas furnace does not operate and the atmospheric pressure is greater than the pressure of air inside the gas furnace, the atmospheric air may get sucked inside the condensate trap and may bring contaminants which may settle in different paths of the furnace. The negative pressure is due to the suction pressure created by an inducer fan for pushing the flue gases through the vent.

The condensate trap described herein comprises a front portion and a back portion to control the positive and negative pressure encountered by the condensate trap. The back portion of the condensate trap further comprises a first passage enclosed between the first wall, a second wall, and a back wall. The back portion comprises a first opening between the first wall and the second wall and within the first passage. The first opening is configured in the form of a groove for letting a first float to sit into the first opening. The diameter of the first opening is lesser than the diameter of the first float. In other words, the first float is configured such that it does not pass through the opening in the first passage below the opening. The first passage comprises a first constriction such that clearance (hereinafter, "distance D") between the first wall and the second wall is less than the diameter of the first float. The first constriction is configured such that the float does not leave the first passage between the first wall and the second wall. The features with respect to the back portion are provided generally to control the positive pressure encountered by the condensate trap when the flue gases flow into the first passage.

The condensate trap described herein also comprises the front portion with a second passage enclosed within the third wall and the fourth wall. It is noted that the features of the front portion are provided immediately at the back of the back portion separated by a back wall. The front portion further comprises a second opening between the third wall and the fourth wall. The second opening may be similar to the first opening. Alternatively, the second opening may have different configuration than the first opening. A second float is placed below the second opening such that the second float is not allowed to rise or travel above the second opening. This may be ensured by keeping the diameter of the second float greater than the diameter of the second opening. Various other configurations of the second float and the second opening to retain the second float below the second opening are also within the scope of the invention. Further, the dimension and structure of the second float may be similar to the first float as described in FIGS. 3A-3F.

Different features of the invention are described with reference to figures as described below. The different figures provide an easy explanation of the different embodiments of the invention.

Turning now to Figures and drawings, FIG. 1 describes a back portion or back view of the condensate trap 100. The back view also illustrates the positive pressure side flow of the flue gases in the condensate trap. As can be seen in FIG. 1, the condensate trap comprises a first inlet 102 and second inlet 104. The condensate trap 100 comprises a first opening 106. The condensate trap further comprises first wall 108 and a second wall 110. The condensate trap 100 also comprises a back wall 112. The first wall 108, the second wall 110, and the back wall 112 are configured to define a first passage in which the first opening 106 is fixed. The condensate trap also comprises a reservoir 148 adjacent to the first passage.

A general process related to escaping of the flue gases and the condensate is explained now. After combustion in the gas furnace, the flue gases are drawn by the inducer motor of the gas furnace and pushed safely through the vent to the atmosphere. In 90% gas furnaces more heat is extracted from the flue gases, as a result condensation starts in a secondary heat exchanger.

The first inlet 102 correspond to positive pressure side. The flue gases are pushed by the inducer motor towards the vent. During this process some of the condensate is also pushed with flue gases. The condensate is collected in a vent elbow (not shown) and then flows to an opening in a collector box (not shown) which is connected to the first inlet 102. From the first inlet 102, condensate flows through the back side of the condensate trap 100 and then to the front side from a bottom opening to a central chamber 146 (explained in FIG. 13). The condensate then is drained from the central chamber 146 to the atmosphere.

Negative pressure side corresponds to the second inlet 104. The condensate in the secondary heat exchanger flows towards the collector box to the second inlet 104. From the second inlet 104, the condensate flows through the front side of the trap and then moves towards back from the bottom opening and then to the central chamber 146. The condensate is then drained from the common reservoir to the atmosphere.

Figure 2:
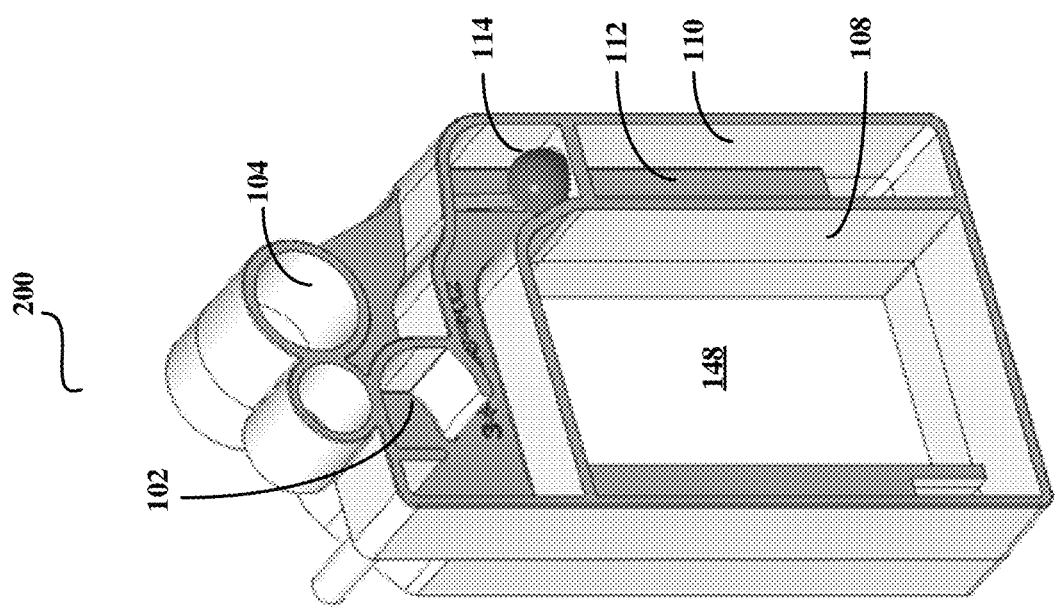
FIG. 2 depicts an embodiment of the invention of the condensate trap with detailed features according to an embodiment of the invention.
Figure 3A:
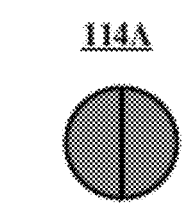
FIGS. 3A-3F depict different types of floats used in the condensate trap according to an embodiment of the invention.
Figure 3B:
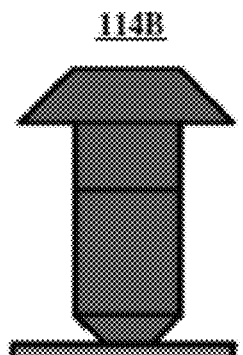
Figure 3C:
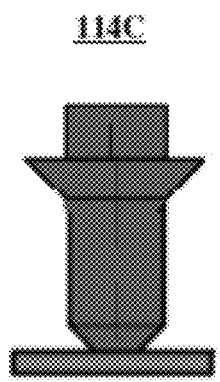
Figure 3D:
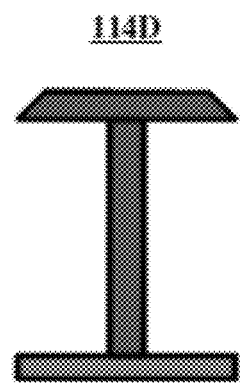
Figure 3E:
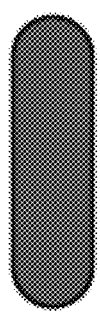
Figure 3F:
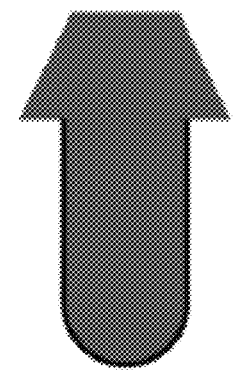

FIG. 2 depicts the back portion of the condensate trap 200 same as shown in FIG. 1, but with a first float 114. The other configurations of the condensate trap are exactly same as shown in FIG. 1. The first float 114 is placed on the first opening 106 in the first passage formed by the first wall 108, the second wall 110, and the back wall 112. The back portion may be covered using a cover. The cover may include a portion of the first opening 106 and another portion of the first opening 106 may be attached with the back portion between the first wall 108 and the second wall 110, i.e. within the first passage. The portion of the first opening with the cover and the other portion of the first opening with the back portion are aligned such that they form a single first opening 106.

FIGS. 3A-3F depict different types of the floats which can be placed on the first opening 106. The floats described herein are generally available floats which can be used to achieve the objectives of the present invention. The dimensions of these generally available floats may be modified in accordance with the embodiments of the invention. The first float 114 may be configured such that the first float sits on the first opening 106 and does not travel or pass below the first opening 106 in the passage. The first float may be spherical 114A in shape and the diameter of the first float is greater than the diameter of the opening. Further, the first float may be a nail-shaped 114B with a tapered cap. The tapered cap may have the largest diameter greater than the diameter of the first opening 106. Similarly, the first float may be nail-shaped with tapered portion in between the top portion and bottom portion of the float as shown in 114C. In this case the largest diameter of the tapered portion is greater than the diameter of the first opening 106. Similarly, the first float 114 may be I-shaped 114D where the width of the top portion and the bottom portion of the I-shaped float is greater than the diameter of the first opening 106. Similarly, a capsule-shaped float 114E and the capsule shaped float with a tapered cap 114F may also be configured such that the first float remains above the first opening 106. Various other configurations of the first opening 106 and the first float 114 other than described herein and capable of retaining the first float 114 above the first opening 106 are within the scope of the invention.

Figure 4C:
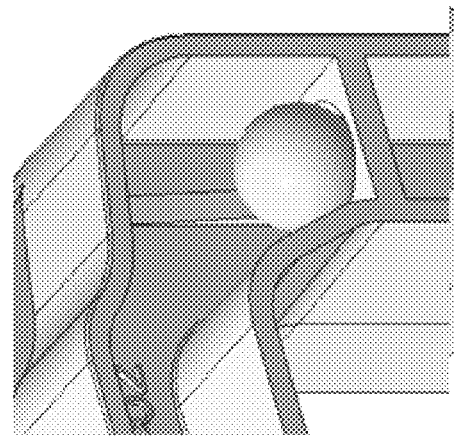
FIGS. 4A-4C depict different features of the condensate trap according to an embodiment of the invention.
Figure 4B:
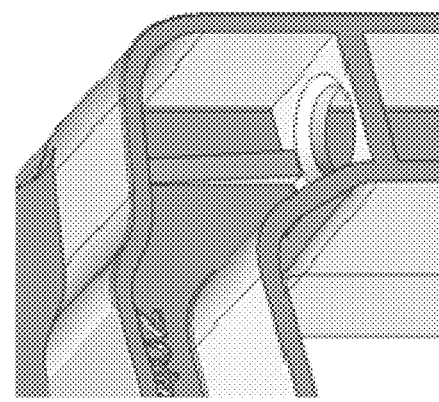
Figure 4A:
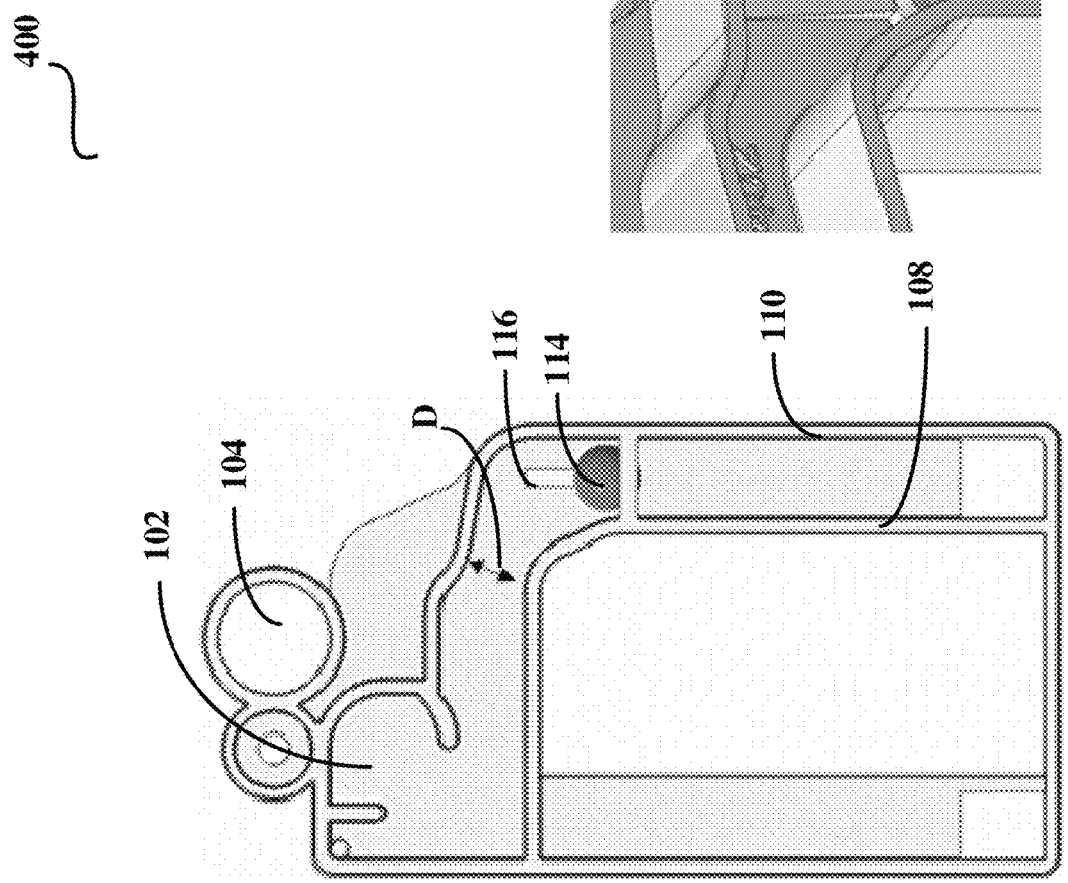

FIGS. 4A-4C depict the back portion of the condensate trap 400 similar to the condensate traps described in FIGS. 1-2. In the embodiment shown in FIG. 4A the condensate trap 400 is shown with a first constriction with clearance of length D between the first wall 108 and the second wall 110. The first constriction, D enables the passage to restrict the first float 114 from escaping to the upper portion of the condensate trap beyond the first constriction, D. FIG. 4A further illustrates a guide 116 on the back wall 112 terminating just above the first opening 106. The guide 116 is configured on the back wall 112 to assist the first float 114 in retaining the position above the first opening 106. FIG. 4B illustrates a magnified version of the portion of the condensate trap with the guide 116 clearly showing the position of the guide 116 therein. Similarly, FIG. 4C illustrates the magnified version of FIG. 4A with the first float 114 placed on the first opening 106 with the help of the guide 116.

This embodiment of the invention is advantageous over the existing condensate traps since the different features such as the first opening 106, the first float 114, the first constriction and the other features allow controlled flow of the condensate and the flue gases in the condensate trap.

Figure 5C:
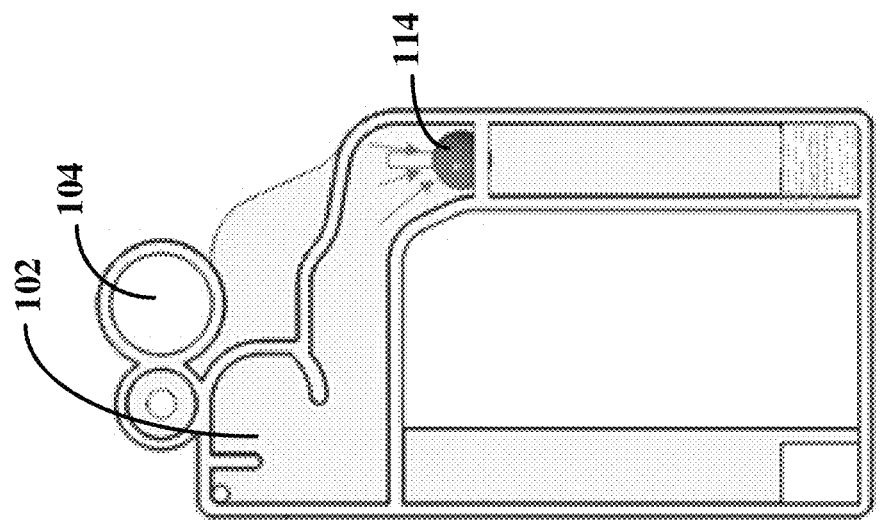
FIGS. 5A-5C depict working of the condensate trap in the back portion during positive pressure inside the condensate trap according to an embodiment of the invention.
Figure 5B:
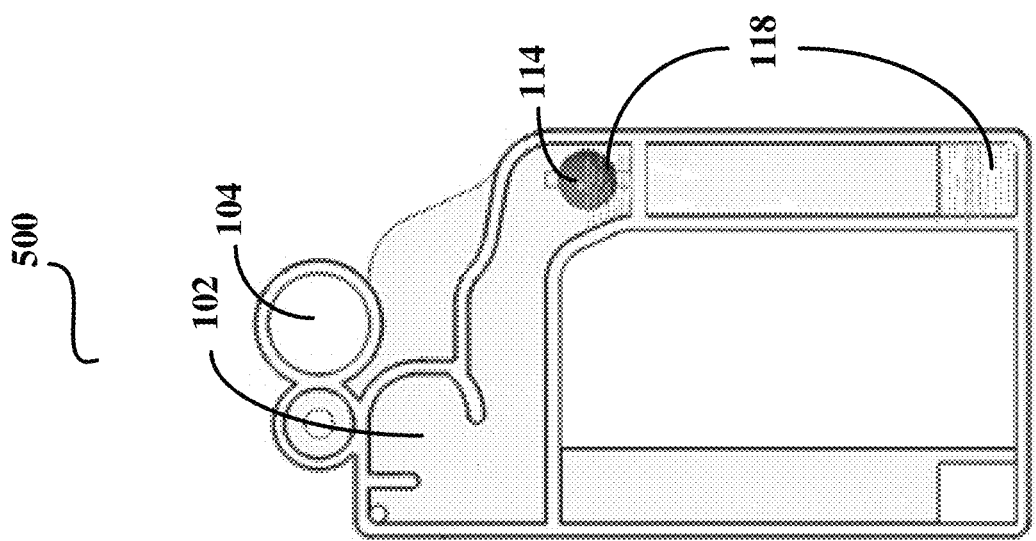
Figure 5A:
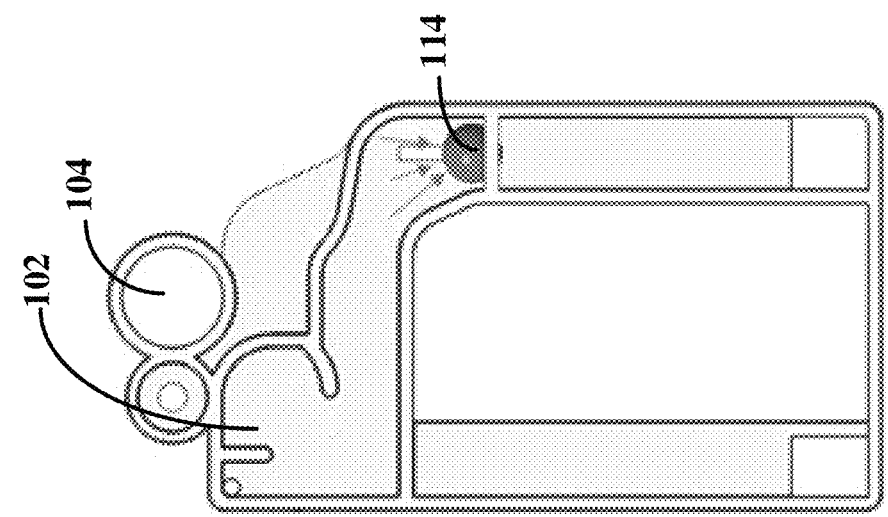

FIGS. 5A-5C depict action of the positive pressure from the flue gases supplied from the heat exchanger in positive direction in the back portion of the condensate trap 500. Once the flue gases enter the condensate trap 500 in the positive direction from the first inlet 102 and if there is any blockage to the vent, the flue gases try to escape through the positive pressure side to the atmosphere/room. The pressure created is high enough to spill off the condensate in the positive side and to the central chamber 146 by the flue gases to escape.

Now the working of the condensate trap 500 of the present invention is described which prevents the flue gases from the positive pressure side to escape. If no condensate is present in the condensate trap, due to its self-weight, and force exerted by flue gases the first float 114 pushes towards the first opening 106. The first float 114 is forced to sit in the first opening 106. When the condensate 118 starts to flow into the passage, the condensate 118 gets collected over the first float 114. Due to buoyancy provided by the condensate 118 to the first float 114, the first float 114 rises above the first opening 106 and the condensate starts to flow to the bottom of the passage as shown in FIG. 5B. Moreover, once the condensate 118 flows down the passage, the first float 114 retains its place over the first opening 106 since the positive air pressure continues to exert the pressure on the first float 114 as shown in FIG. 5C.

This embodiment of the invention provides the advantage that the air from combustion including the flue gases remains over the first float 114 and is not able to flow downward into the passage and further into the ambient atmosphere/room.

FIGS. 6A-6B depict a pictorial view of the different configurations of the first float in the first opening 106. The first float 114 may be a guided using a vertical guide 120 coupled with the first float 114 as shown in FIG. 6A. This allows the first float 114 to move in vertical direction only and provides lesser leakage of the flue gases from above. In contrast, the first float 114 without any vertical rod or guide may float due to buoyancy of the condensate 118 and may allow the flue gases to flow along with the condensate in small amount as shown in FIG. 6B.

FIGS. 7A-7B depict a detailed view of the front portion of the condensate trap. The front portion comprises a second opening (groove) 126 as shown in FIG. 7A The front portion comprises a third wall 122, a fourth wall 124 and a back wall 128. A second passage is enclosed between the third wall 122, the fourth wall 124, and the back wall 128. FIG. 7A further comprises the inlet 104 to allow the condensate/to flow in the front portion of the condensate trap. The front portion also comprises a fifth wall 130, a sixth wall 132, and a back wall 134. The fifth wall 130, the sixth wall 132, and the back wall 134 enclose a third passage for the condensate to flow from the back portion of the condensate trap. FIG. 7B further discloses a second float 136 which is placed below the second opening 126. The second float 136 is configured such that it does not travel or pass above the second opening 126.

This embodiment of the invention is advantageous over the existing condensate traps since the different features such as the second opening 126, the second float 136, the second constriction 138 will restrict the flow of condensate back to furnace during operation and restrict atmospheric air with contaminants to the furnace.

Figure 8:
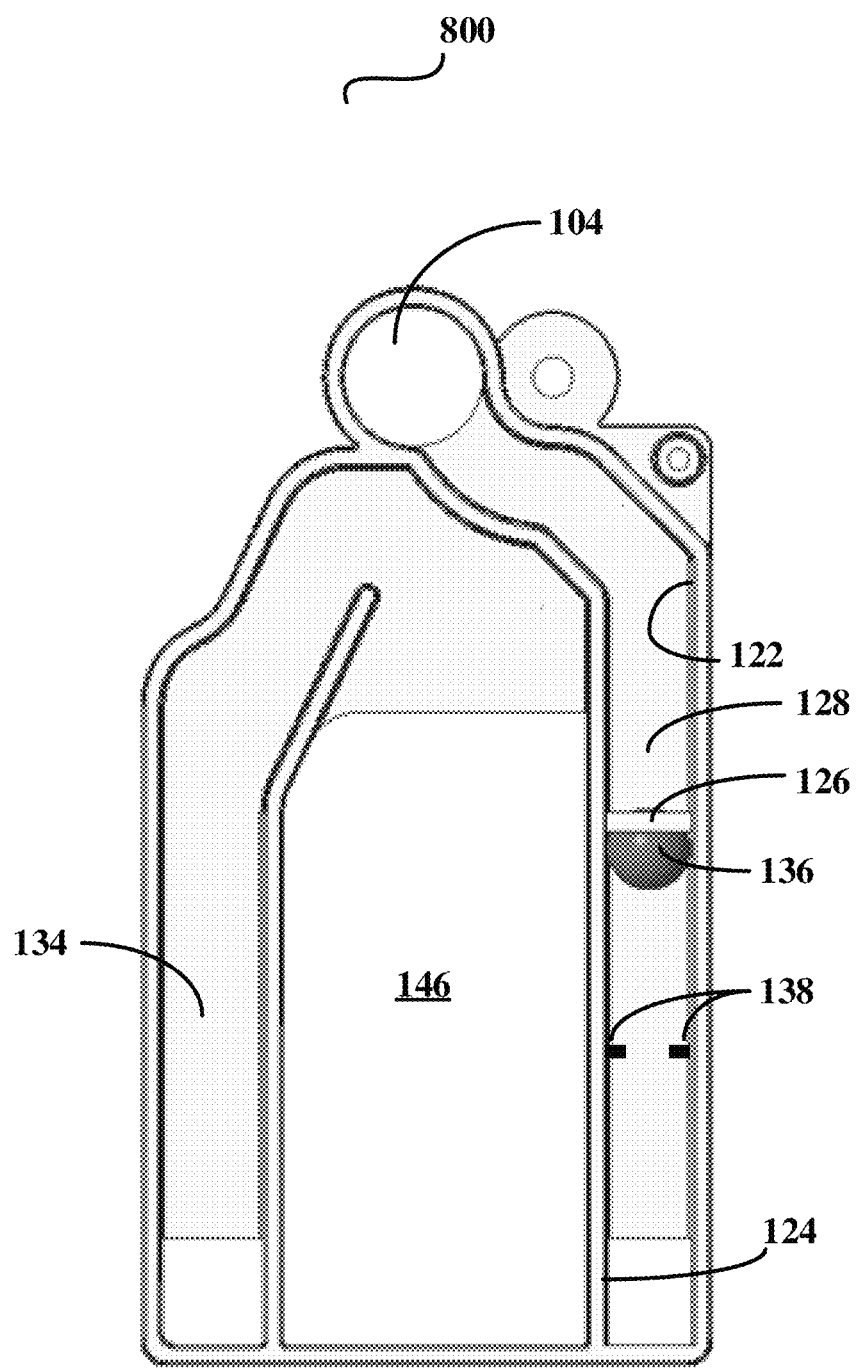
FIG. 8 depicts additional features in the condensate trap according to an embodiment of the invention.

FIG. 8 describes another feature which may be added in the second passage between the third wall 122 and the fourth wall 124. The second passage comprises a second constriction 138 which may be in the form of extended edges one each from the third wall 122 and the fourth wall 124. The objective of the second constriction is not to allow the second float 136 to fall below a predetermined level as shown in FIG. 8.

The working of the condensate trap from the front portion with different features as explained above is described via FIGS. 9A and 9B. When the negative pressure and the condensate 118 is collected at the bottom of the second passage, the air with the negative pressure flows above the condensate 118 and passes in the upward direction. In this case, the second float 136 would move in upward direction and would be blocked by the second opening 126. The second opening 126 restricts the second float 136 from moving further in upward direction, thereby blocking the second opening 126. Consequently, the condensate 118 collected at the bottom of the second passage cannot move above the second opening 126. The condensate 118 may then has the only option to move out from the bottom of the second passage.

Figure 9B:
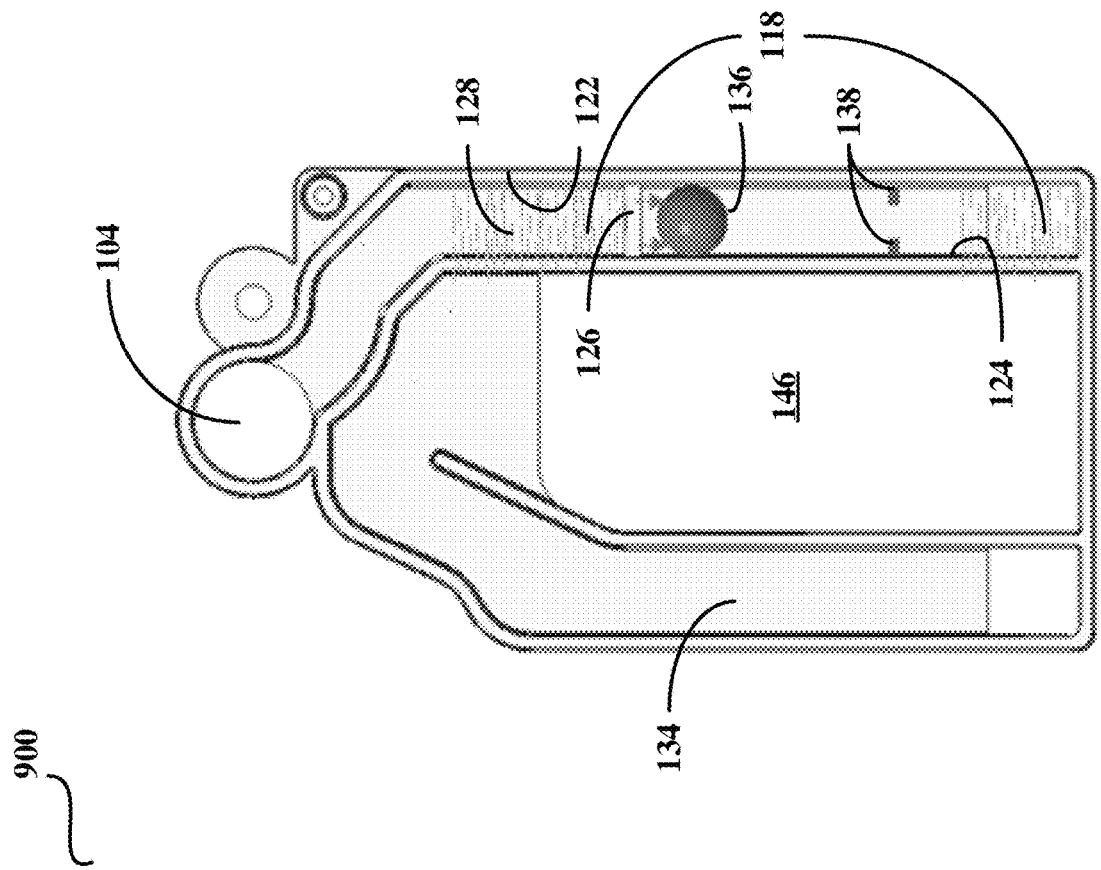
FIGS. 9A-9B depict working of the condensate trap in the front portion according to an embodiment of the invention.
Figure 9A:
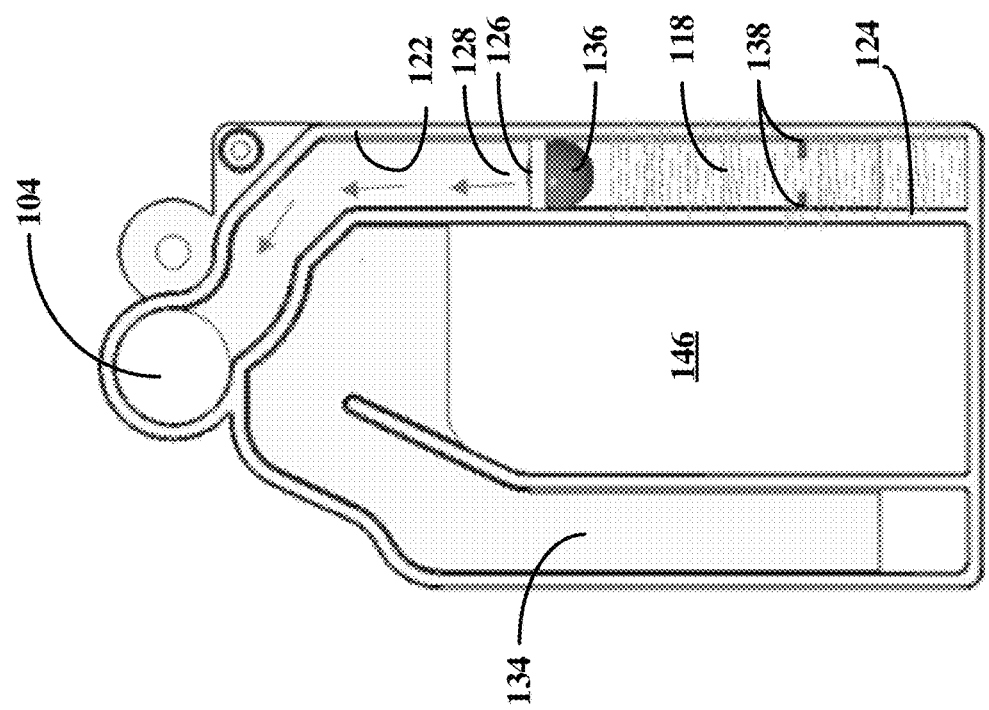

If the condensate below the second opening 126 is lower, the second float 136 would fall down due to gravity towards the second constriction 138. The condensate 118 received from the second passage between the third wall 122 and the fourth wall 124 In another embodiment as shown in FIG. 9B, if the condensate 118 flows from above the second opening 126 and the level of condensate 118 below the second opening 126 from the bottom of the second passage is lower, the condensate 118 above the second opening 126 may flow in the downward direction below the second opening 126. This allows the condensate 118 collected above the second opening 126 and the second float 136 to flow through the second opening 126.

FIGS. 10A and 10B illustrates another embodiment of the invention in which back portion with the negative air pressure is described. The embodiment shown in FIG. 10A illustrates another feature of a hinged float/levered float 140 provided near bottom of the second passage. When there is negative pressure inside the condensate trap due to the inducer motor, the levered float 140 moves up and blocks the flow of the condensate collected at the bottom of the second passage. Again, as discussed above, the only way for the condensate 118 is to flow in the downward direction to exit.

Similarly, if there is sufficient amount of condensate 118 collected above the levered float 140 (in closed position), due to weight of the water column above the levered float 140, the levered float is pushed down to open the levered float 140. The condensate collected above the levered float 140 now flows through the open levered float 140. This is shown in FIG. 10B.

FIG. 11A discloses another embodiment of the invention in which the fourth wall 124 may be inclined with the configuration of the condensate trap as described in FIGS. 11A and 11B. The operation of the levered float 140 is same as described in FIGS. 10A and 10B. By the virtue of the inclined fourth wall, the variable cross-sectional area formed within the second passage creates more negative pressure and help the condensate 118 to flow down the passage by exerting more negative pressure at the bottom of the passage.

Figures 12A, 12B:
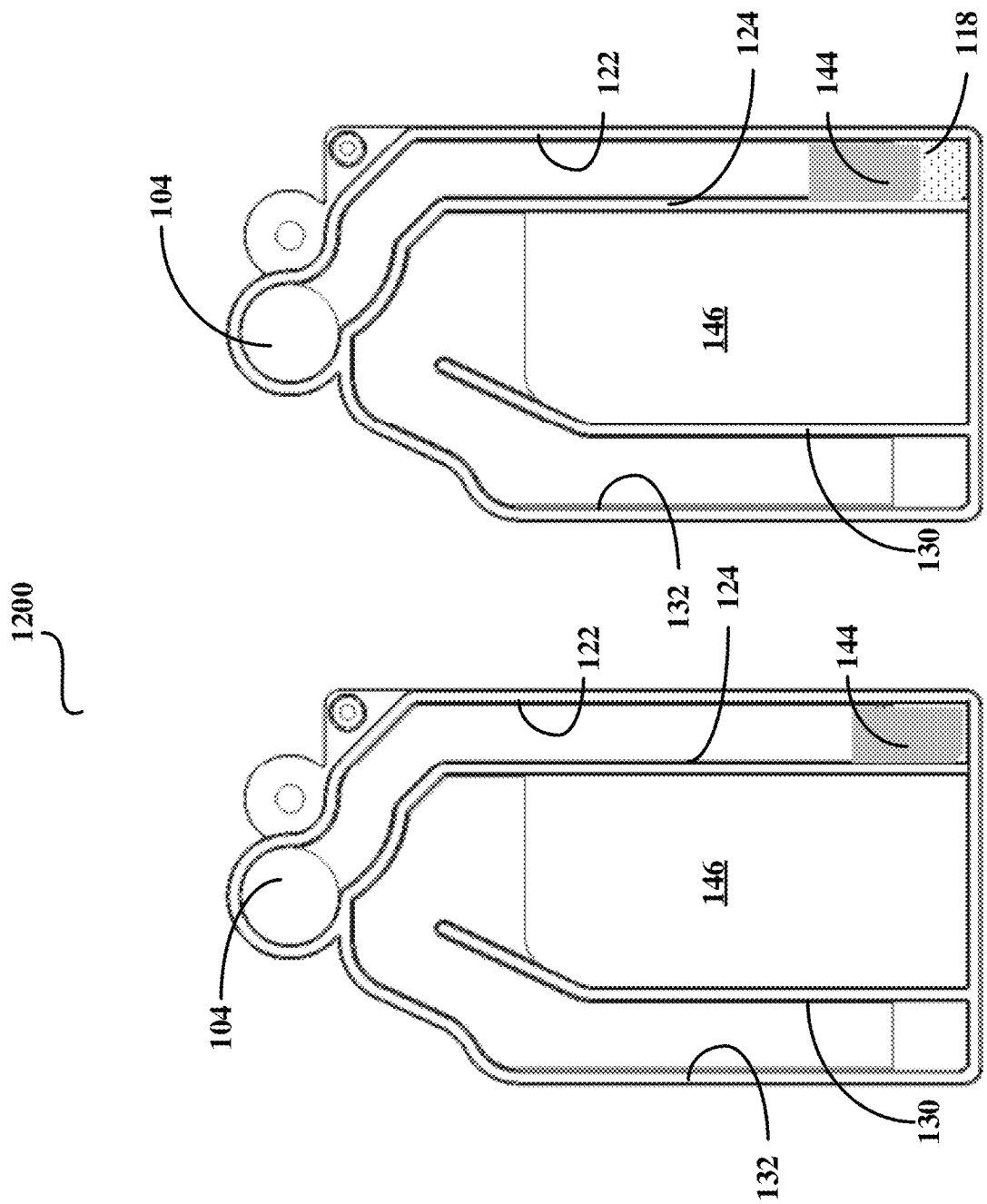
FIGS. 12A-12B depict placement of the float according to an embodiment of the invention.

Similarly, according to an embodiment of the invention, the levered float 140 as described above may be replaced with a sliding float 144 within a channel placed at the bottom of the second passage as shown in FIGS. 12A-12B. The sliding float 144 may be in closed position as shown in FIG. 12A. When the condensate collects at the bottom of the passage, due to buoyancy the sliding float 144 may move in the upward direction as shown in FIG. 12B and allows the condensate 118 to move into a central portion of the condensate trap. Once the condensate flows out from the second passage due to self-weight, the sliding float moves into the closed position.

Figures 13A, 13B, 13C:
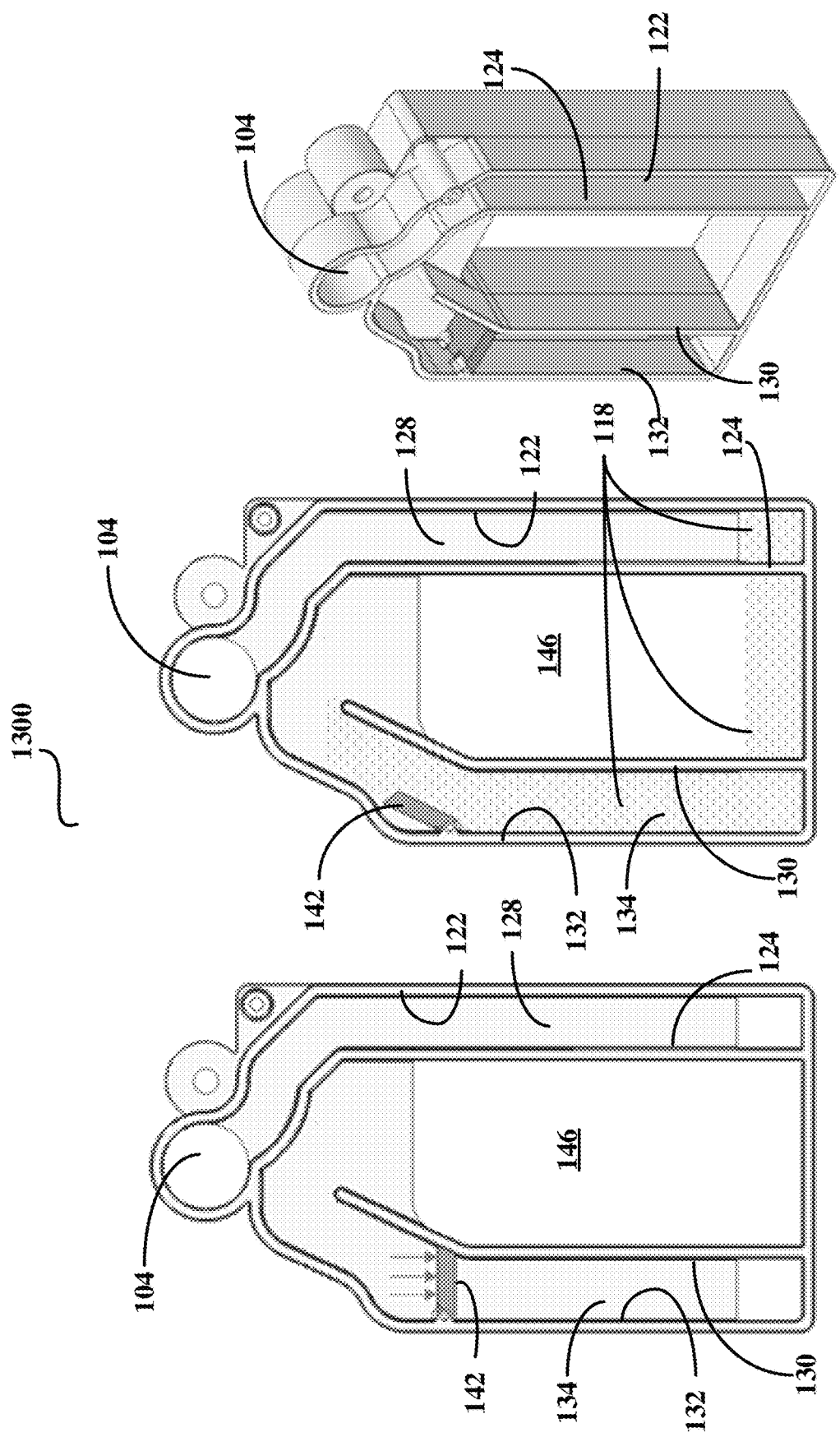
FIGS. 13A-13C depict working of the condensate trap in the front portion during positive pressure according to an embodiment of the invention.

FIGS. 13A-13C depict the front portion of the condensate trap 1300 when a positive pressure is exerted on the condensate trap. It may be noted that the condensate trap described in FIGS. 13A-13C is the same as the one described in the FIGS. 1-11. When the positive pressure is exerted and the gas furnace is not operating, a levered flap 142 is in closed position to prevent contaminants entering into the furnace. This is by the virtue of atmospheric air pressure exerted above the levered flap 142 and floats default/stable position as shown in FIG. 13A.

FIG. 13B illustrates a condition when the gas furnace is operating and the condensate flows from a bottom opening of a left chamber or a third passage enclosed by the fifth wall 130, the sixth wall 132, and the back wall 136. The condensate flows 118 into the third passage and flows in the upward direction. This allows the condensate 118 to open the levered flap 142 and flow in a central chamber 146 of the condensate trap as shown in FIG. 13B. The condensate 118 starts collecting in the central chamber 146. From the central chamber 146, the condensate further flows to the second passage from the conduit (not shown) present at the bottom of the second passage and connecting the central chamber 146.

FIG. 13C illustrates a 3-dimensional detailed view of the front portion of the condensate trap 1300. The FIG. 13C clearly illustrates the levered flap 142 from the side view along with the third wall, fourth wall, fifth wall, and the sixth wall as described above.

The present invention is applicable in various industries/fields such as, but is not limited to, hospitality industry, residential complexes, offices, universities, hospitals, colleges, homes and any such industry/field that is well known in the art and where the HVAC systems are used.

The embodiments of the invention discussed herein are exemplary and various modification and alterations to a person skilled in the art are within the scope of the invention. Though the present invention has been described considering an exemplary gas furnace still the invention is applicable to all the external condensate drains which require a condensate trap.

When introducing elements of aspects of the invention or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C".

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A condensate trap comprising:
   a back portion comprising a first passage enclosed between a first wall and a second wall, the back portion further comprising:
   a first opening connecting the first wall and the second wall;
   a first float placed over the first opening such that the first float does not travel below the first opening; and
   a first constriction above the first opening such that the float does not leave the first passage; and
   a front portion comprising a second passage enclosed between a third wall and a fourth wall, the front portion further comprising:
   a second opening connecting the third wall and the fourth wall;
   a second float placed below the second opening such that the second float does not travel through the second opening; and
   a second constriction below the second opening such that the second float does fall below a predetermined level;
   wherein when there is a positive pressure in the condensate trap, and there is no condensate collected in the first passage, the first float is pushed by the positive pressure in the first opening.

2. The condensate trap of claim 1, wherein the first float is of spherical shape, a cylindrical shape with a cap, or I-shaped with ends floating between the first opening.

3. The condensate trap of claim 1, wherein a back wall of the first passage comprises a guide to hold the first float in the first opening.

4. The condensate trap of claim 1, wherein the first float comprises a guide through the first float enabling the first float to move in vertical direction.

5. The condensate trap of claim 1, wherein the back portion comprises a first enclosure adjacent to the first passage.

6. The condensate trap of claim 1, wherein the condensate trap manages the flow of condensate and flue gases in a gas furnace.

7. The condensate trap of claim 1, wherein when the condensate collected over the first float flows through the opening completely, the first float returns in the first opening under the influence of flue gases.

8. The condensate trap of claim 1, wherein the back portion is provided with a cover, wherein a portion of the first opening is attached with the cover and another portion of the first opening is attached with the back portion within the first wall and the second wall.

9. The condensate trap of claim 1, wherein the condensate trap comprises a condensate and flue gases inlet and a condensate drain outlet.

10. The condensate trap of claim 1, wherein when condensate is collected on the first float during the positive pressure, the first float is pushed in an upward direction and the condensate flows through the first opening.

11. A condensate trap comprising:
    a back portion comprising a first passage enclosed between a first wall and a second wall, the back portion further comprising:
    a first opening connecting the first wall and the second wall;
    a first float placed over the first opening such that the first float does not travel below the first opening; and
    a first constriction above the first opening such that the float does not leave the first passage; and
    a front portion comprising a second passage enclosed between a third wall and a fourth wall, the front portion further comprising:
    a second opening connecting the third wall and the fourth wall;
    a second float placed below the second opening such that the second float does not travel through the second opening; and a second constriction below the second opening such that the second float does fall below a predetermined level;

wherein when there is a negative pressure in the condensate trap, and condensate is collected in the second passage below the second opening, the second float is pushed up by the negative pressure and placed in the second opening.

12. The condensate trap of claim 11, wherein when the second float is placed in the second opening, the condensate collected below the second opening is prevented to pass through the second opening.

13. The condensate trap of claim 11, wherein when the condensate is collected above the second opening, the second float moves down to allow the condensate to pass through the second opening and collect below the second opening.

* * * * *